UNITED STATES PATENT OFFICE.

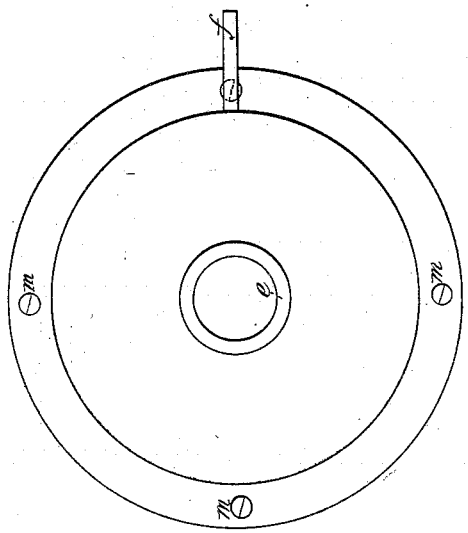
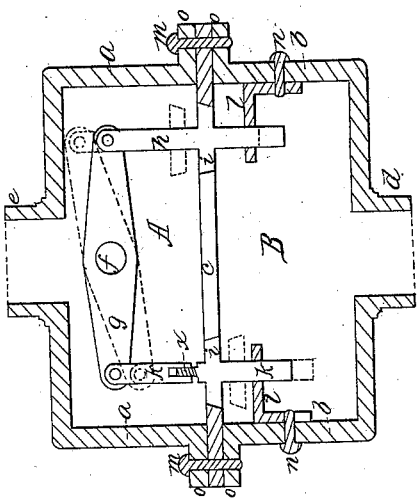

EDWARD ARMSTRONG, OF PITTSBURG, PENNSYLVANIA.

GOVERNOR-VALVE OF STEAM-ENGINES.

Specification of Letters Patent No. 27,677, dated April 3, 1860.

*To all whom it may concern:*

Be it known that I, EDWARD ARMSTRONG, of Pittsburg, in the county of Allegheny, in the State of Pennsylvania, have invented a new and Improved Balance-Valve for Governors of Steam-Engines; and I do hereby declare that the following is a full and exact description thereof, reference being had to the accompanying drawing and to the letters of reference marked thereon.

The nature of my invention consists in dividing the valve chamber or governor valves of steam engines into two compartments, and in so arranging and balancing two valves that an equal pressure of steam is made to act on each valve, thereby equally balancing them, the whole being arranged and operating in the manner hereinafter described.

To enable others skilled in the art to make and use my invention, I will proceed to describe its construction and operation.

In the accompanying drawings, Figure 1, is a cut or sectional view of my improved balance valve. Fig. 2, is a top view;

(A) is the upper chamber; (B) is the lower chamber; (a and b) is the outside casing of chambers (A and B); (c) is the division plate which divides chambers (A and B); the division plate (c) is furnished with two valve seats into which is fitted two valves marked (j and i) which are furnished with stems marked (k and h), these stems are attached to the balance lever (g) which is secured to the shaft or axis (f). To the shaft or axis (f) is attached in the usual manner the governor. The lower end of the stems (k and h) move in guides which are secured to the sides of casing (b) by screws or bolts (n). It will be observed that the casing (a, b,) and the division plate (c) are held together by bolts or screws (m) in the flanges (o).

The stem (k) of valve (j) is furnished with a regulating screw marked (x), by means of this screw, when the valves wear so as not to be steam tight, it can be regulated readily so as to make it steam tight. It will be observed that by shortening or lengthening the stem (k) by means of the screw (x), the stem (h) and valve (i) is equally effected with the stem (k) and valve (j), (e and d) are the pipes which lead from the boiler and to the engine.

The operation of my improvement is as follows: The steam is let into chamber (A) and passes from it through the valves into chamber (B) and from it to the engine. The valve (j) opens down into chamber (B) and the valve (i) opens up into chamber (A); the dotted lines show the position of the valves and the parts to which they are attached when the valves are open, the size of the valves being equal and the steam pressing on them in like manner balances them perfectly.

Having thus described the nature, construction, and operation of my improved valve, what I claim as of my invention and desire to secure by Letters Patent of the United States is—

Dividing the valve chamber of governor valves into two compartments by means of the division plate (c) furnished with valves (j and i) constructed arranged and operated in the manner herein described and for the purpose set forth.

EDWARD ARMSTRONG.

Witnesses:
   JAMES J. JOHNSTON,
   GEORGE P. STECK.